(12) United States Patent
Teague et al.

(10) Patent No.: US 7,043,505 B1
(45) Date of Patent: May 9, 2006

(54) METHOD VARIATION FOR COLLECTING STABILITY DATA FROM PROPRIETARY SYSTEMS

(75) Inventors: Tommy Kay Teague, Mission Viejo, CA (US); Kathryn Ann McDonald, Yorba Linda, CA (US); Diana Love Van Der Linden, Trabuco Canyon, CA (US)

(73) Assignee: Unisys Corporation, Blue Bell, PA (US)

( * ) Notice: Subject to any disclaimer, the term of this patent is extended or adjusted under 35 U.S.C. 154(b) by 565 days.

(21) Appl. No.: 10/352,662

(22) Filed: Jan. 28, 2003

(51) Int. Cl.
*G06F 17/30* (2006.01)
*G06F 9/44* (2006.01)

(52) U.S. Cl. .................. 707/203; 707/200; 719/318

(58) Field of Classification Search ............... 707/1–3, 707/200; 719/318
See application file for complete search history.

(56) References Cited

U.S. PATENT DOCUMENTS

| 5,551,003 | A | | 8/1996 | Mattson et al. |
| 5,636,360 | A | | 6/1997 | Courts et al. |
| 5,819,094 | A | | 10/1998 | Sato et al. |
| 5,870,590 | A | | 2/1999 | Kita et al. |
| 6,021,408 | A | * | 2/2000 | Ledain et al. ............. 707/8 |
| 6,263,338 | B1 | | 7/2001 | Ronstrom et al. |
| 6,778,980 | B1 | * | 8/2004 | Madan et al. ............. 707/3 |
| 2004/0049693 | A1 | * | 3/2004 | Douglas ................ 713/200 |
| 2004/0054566 | A1 | * | 3/2004 | J'Maev .................... 705/7 |

* cited by examiner

*Primary Examiner*—Alford W. Kindred
(74) *Attorney, Agent, or Firm*—Alfred W. Kozak; Mark T. Starr; Nathan Cass

(57) ABSTRACT

A Cellular Multi-Processor Serve provides partitions having different Operating Systems such as Windows, Unix OS2200 (Unisys), Master Control Program (Unisys) or other Operating Systems, which could be designated as OS-A or OS-B. The present method and system collects and scans availability and reliability information which involve non-windows partitions with respect to planned and unplanned stops, system starts and different categories of error conditions.

21 Claims, 10 Drawing Sheets

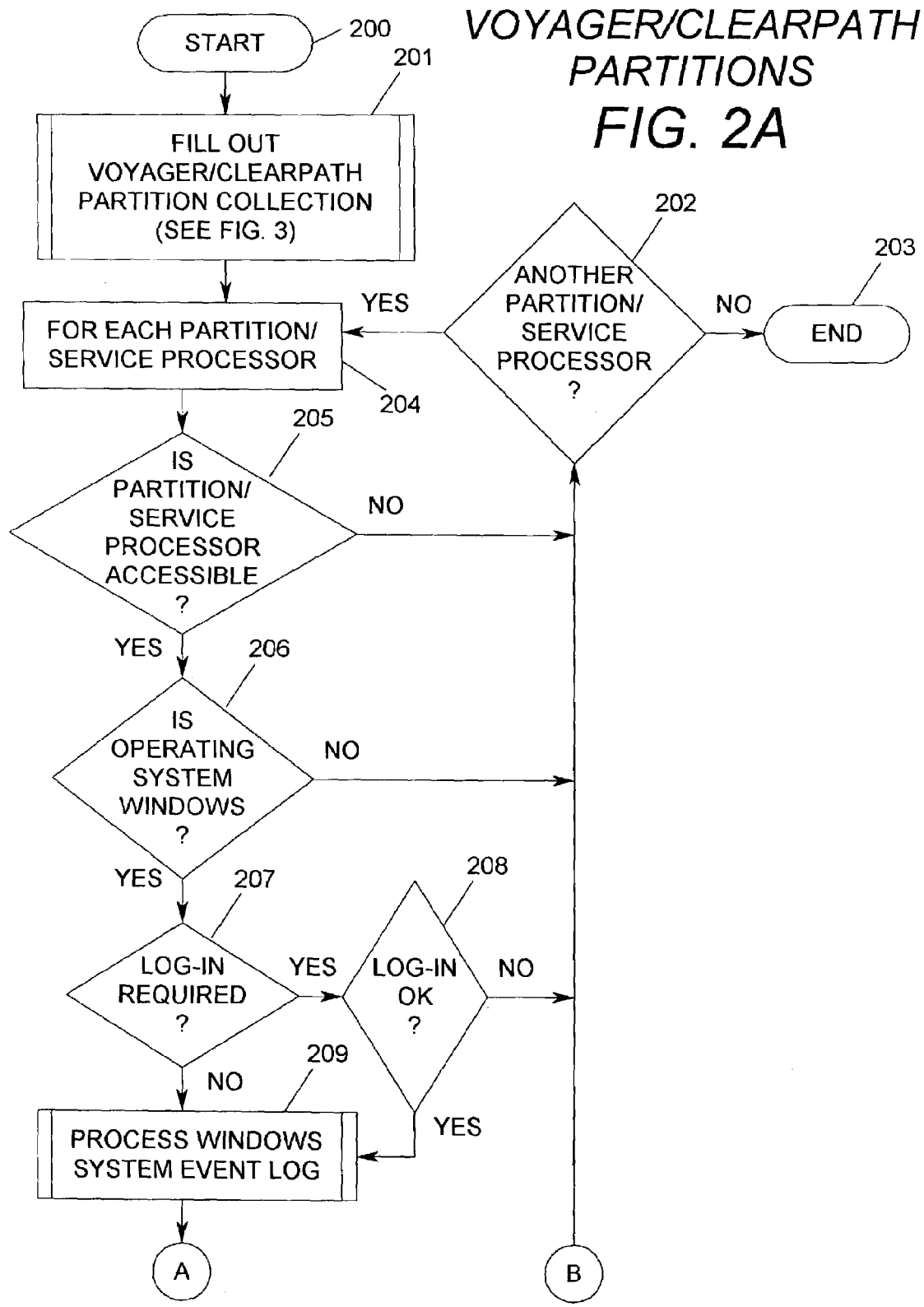

*SCANNING FOR VOYAGER/CLEARPATH PARTITIONS CONTINUED*

FILL PARTITION
COLLECTION

HANDLE EVENT
SOURCES

HANDLE VOYAGER EVENTS

HANDLE
PENDING
STOPS

*HANDLE CLEARPATH EVENTS*

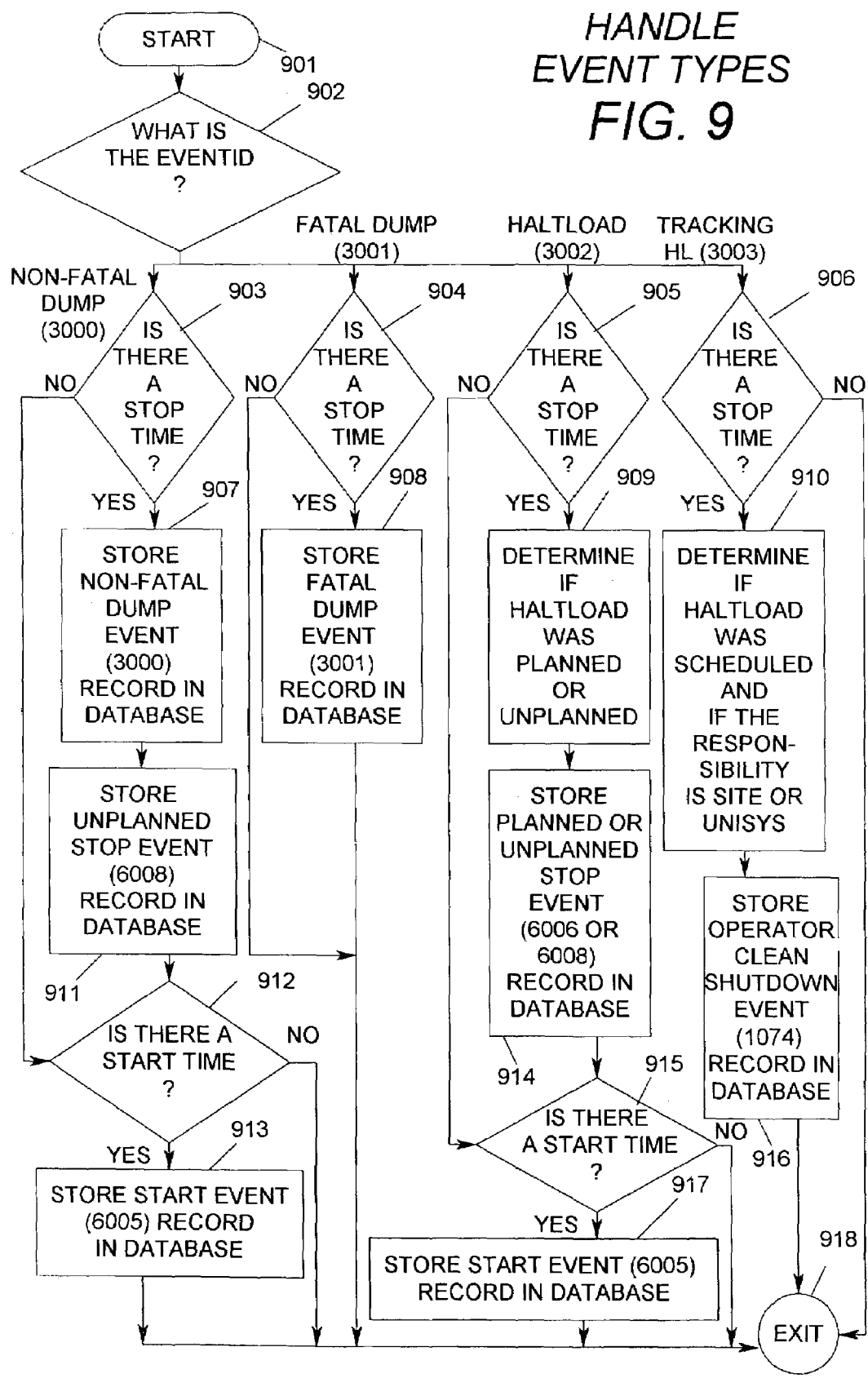

METHOD VARIATION FOR COLLECTING STABILITY DATA FROM PROPRIETARY SYSTEMS

FIELD OF THE INVENTION

The present invention generally relates to a method which programmatically collects a set of event occurrences from several specialized platform partitions, which may be part of a Cellular Multi-Processor (CMP) Server, and harvests the information from the application event log of the CMP Server, parses and interprets the data, and stores the information in a local Microsoft Access database.

CROSS-REFERENCES TO RELATED APPLICATIONS

This application is related to co-pending U.S. Ser. No. 10/308,388, entitled "Method For Scanning Windows Event Logs In A Cellular Multi-Processor (CMP) Server", which is incorporated herein by reference.

This application is related to co-pending U.S. Ser. No. 10/308,370, entitled "Method For Collecting And Transporting Stability Data", which is incorporated herein by reference.

BACKGROUND OF THE INVENTION

As part of the overall method to gather stability information from each partition of a CMP Server, the method to collect the data from Unisys Voyager and ClearPath partitions is different and unique. It requires reading through the application event log of the main Service Processor of the CMP Server and scanning for event entries from the Unisys Voyager and ClearPath specialized proprietary partitions. If event entries are found for a Voyager or ClearPath partition, which is being scanned, and from the timeframe that is being scanned, the event data is parsed and an appropriate event record is stored in the EventLogData table of the local Access database. This database is used to store information about the configuration of one or more CMP Servers as well as the event data. This data is periodically transmitted to a central database within central Unisys Engineering for analysis and reporting. This method focuses specifically on the collection of event data from specialized partitions, which are designated as Unisys Voyager and ClearPath partitions.

One prior art method to which the method of the present invention generally relates is described in U.S. Pat. No. 5,819,094 entitled "Apparatus For Log Data Collection And Analysis". This prior art method is an apparatus for log data collection and analysis, which provides a history diagram to visualize program behavior and enhanced tools for analysis by utilizing part-to-part association between the history diagram and a source program. A log data collector collects log records during program execution and stores them in a storage unit. A log data analyzer retrieves and analyzes the records to find the types of program operations and their respective execution time. A diagram generator converts the result of the analysis into a history diagram and outputs it to a display unit. The apparatus further comprises an on-screen position designator and program location analyzer. When a user selects a part of the history diagram, the on-screen position designator obtains its coordinate. The program position analyzer analyzes the coordinate to find a corresponding function and its location in the source program, thus allowing the user to get a function name and line number by simply specifying a part of the history diagram. Moreover, the apparatus comprises a function designator and display position analyzer. When the user specifies a function name and its line number through the function designator, the display position analyzer calculates a corresponding position in the history diagram. Thus, the user can easily locate records of a function of interest in the history diagram.

The present invention differs from the above prior cited art in that the prior invention focuses on an apparatus, which collects data to provide a history diagram in order to visualize program behavior. It provides association between diagrams and source programs and includes a program location analyzer. Contrarily, the purpose of the present invention is to collect stability data from special proprietary systems. The method of the present invention uses existing application logs as the source for data, and stores the information in a local database, which is later sent to a central Engineering group.

Yet another prior art method to which the method of the present invention generally relates is described in U.S. Pat. No. 5,551,003 entitled "System For Managing Log Structured Array (LSA) Of DASDS By Managing Segment Space Availability And Reclaiming Regions Of Segments Using Garbage Collection Procedure". This prior art method includes a Seek affinity, which is preserved in a segment oriented, cached, log structured array (LSA) of DASDs responsive to accesses dominated by sequential read and random writes of logical tracks stored in the segments. This is achieved by collecting all the write modified read active tracks and clean read active tracks (either destaged from the cache or garbage collected from the LSA) and rewriting them out to the LSA as segments into regions of contiguous segments of read active tracks. Also, all write modified read inactive tracks and clean read inactive tracks either destaged from cache or garbage collected from the LSA are collected and rewritten out to the LSA as segments into regions of contiguous segments of read inactive tracks. Garbage collection is initiated when the detected free space in a region falls below a threshold and continues until the collected segments exceed a second threshold. Alternatively, the write age of logical tracks may be used instead of read activity so as to cluster LSA DASDs into a region of segments formed from old write active logical tracks and a region of current write active logical tracks.

The present invention differs from this prior art in that the cited prior art deals with a procedure to manage the physical space of a system. This is in no way related to the method of the present invention, which is to collect stability data from specialized proprietary systems.

Yet another prior art method to which the method of the present invention generally relates is described in U.S. Pat. No. 5,636,360 entitled "Method For Preventing Overwriting Cache Buffer Transaction Entries Until Corresponding Log Buffer Entries Have Been Copied To Log Partition Of The Disk". This prior art method is a method for logging transactions, which alters a file system stored on a secondary storage device. The method includes the steps of writing data to a buffer in a buffer cache and logging the transaction in a log buffer residing on a primary storage device. A flag is set for the modified buffer, which is then added to a list of modified buffers. As the log buffer becomes substantially full, its contents are copied to a log partition residing on the secondary storage device. After an abnormal system shutdown, the contents of the log partition are copied to the buffer cache in order to restore the disk filing system.

The present invention differs from this prior art in that this referenced prior art deals with preventing over-writing cache buffer transactions, including its own logging of transactions. This prior art method is in no way related to the method of the present invention of collecting stability data from specialized proprietary systems using existing application logs.

Yet another prior art method to which the method of the present invention generally relates is described in U.S. Pat. No. 6,263,338 entitled "Method Relating To Databases". This prior art method is a method pertaining to databases and intended to provide reliable collection of log-information in connection with changes in the database. So-called fuzzy checkpoints are used in combination with a physiological log with the intention of enabling log-information to be collected in real time. The data-information belonging to the database is divided into smaller parts in accordance with a predetermined data-structure, where respective parts are distributed on mutually the same pages or on separate pages belonging to the database. The logical UNDO-information required for the fuzzy checkpoint is implemented through the creation of a further part (1') on one of the pages, in the event of a change of one of the parts (1) where old data-information shall be replaced with new data-information. This further part (1') is structurally a replica of the changed part (1). The changed part (1) includes the new data-information (A') and the further part (1') includes the old data-information (A).

The present invention differs from this prior art in that the referenced prior art collects information pertaining to databases and their changes. This is totally unrelated to the present inventions method of collecting stability data from specialized proprietary systems.

Yet another prior art method to which the method of the present invention generally relates is described in U.S. Pat. No. 5,870,590 entitled "Method And Apparatus For Generating An Extended Finite State Machine Architecture For A Software Specification". This prior art method is a system and apparatus for generating an extended finite state machine (EFSM) from a specification expressed as a set of data relationships. The specification is written in a specification language designed for the purpose, and is parsed in a conventional fashion. The parsed specification is used as input to the method of the invention, which comprises routines for transforming it into an EFSM including states and transitions. The EFSM thus generated is used as input to a traversal procedure, for ultimately generating validation tests to verify the operation of an implementation of the specification, with one such test being generated for each path traversed through the EFSM. The traversal of the EFSM may be carried out in a conventional fashion or by using its EFSM traversal method. The EFSM's transitions represent functions and test information, and the states represent the status of the EFSM at particular points, given the traversal of a particular path through the EFSM, i.e. the history of execution of the EFSM. Annotations are generated and correlated with the transitions, the annotations comprising value assignments, variable value partitions, input or other events, constraints on the execution of the EFSM, predicates acting as prerequisites for the traversal of their associated transitions, and test statements that will act to verify operation of the implementation when the validation tests are executed. Diagnostic function strings are generated as annotations to transitions, for outputting diagnostic statements reflecting the success or failure of the implementation upon execution of the validation tests.

The present invention differs from this prior art in that the method of the present invention has nothing to do with generating extended finite state machine architectures, as the cited prior art. The prior art method is totally unrelated to the present inventions method of collecting stability data from specialized proprietary systems.

Previous methods for collecting stability information from a multi-partition Cellular Multi-Processor (CMP) Server system were inaccurate, inconsistent, incomplete, burdensome or untimely. They typically relied on manual intervention by the client or a client representative. These methods were also biased towards systems with a Windows operating system. A means was necessary to provide a mechanism whereas relevant stability information can be collected from other types of systems, which can be part of the CMP Server, such that the data can be gathered and reported in a simple, automated, and consistent manner.

The general purpose of the software methodology described herein is to programmatically collect a set of event occurrences from specialized partitions such as Unisys Voyager and ClearPath partitions, which may be part of a CMP Server. The method harvests the information from the application event log of the CMP Server Management Information Processor (MIP), parses and interprets the data, and stores the information in a central Microsoft Access database. The data is stored in a database with similar information from all the other types of partitions that can make up a CMP Server, in the same format as the other types of partitions. This allows all of the stability data to be reported in a consistent and useful manner.

SUMMARY OF THE INVENTION

It is therefore an object of the present invention to programmatically collect a set of event occurrences from Unisys Proprietary Voyager and ClearPath partitions, which may be part of a CMP Server.

Still another object of the present invention is to allow stability data to be reported in a consistent and useful manner.

Still another object of the present invention is to use a collection to store a list of specialized data such as the Voyager or ClearPath system data that are to be included in the data collection.

Still another object of the present invention is to read through the Application Event Log of the Management Information Processor (MIP), which is also known as the Service Processor.

Still another object of the present invention is to determine if an event is from a designated specialized partition such as a Voyager or ClearPath system and is still within the specified timeframe.

Still another object of the present invention is to parse and interpret the event information that is collected.

Still another object of the present invention is to convert the event information into the same format and codes as other partition types to provide uniform compatibility.

Still another object of the present invention is to store the event information in the local Microsoft Access Database along with the event information from other types of partitions.

The present method enables a programmatic way of collecting a set of event occurrences from Unisys Proprietary Voyager and ClearPath partitions by harvesting information from the application event log. The method implements this capability by parsing, storing, and interpreting data in a Microsoft Access database, and therefore allowing the stability of all data to be reported in a consistent and useful manner. The method also adds system integrity and provides a central Unisys Engineering group with means to measure system stability and availability of proprietary systems such as ClearPath or Voyager systems, along with other system partitions.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 2A and 2B Show the overall process that this methodology functions to prepare for and scan the logs of each partition and store meaningful event information into a local database.

FIG. 9 is a flowchart illustrating the process for handling the different event types of ClearPath partition events.

GLOSSARY ITEMS

Figure 1:
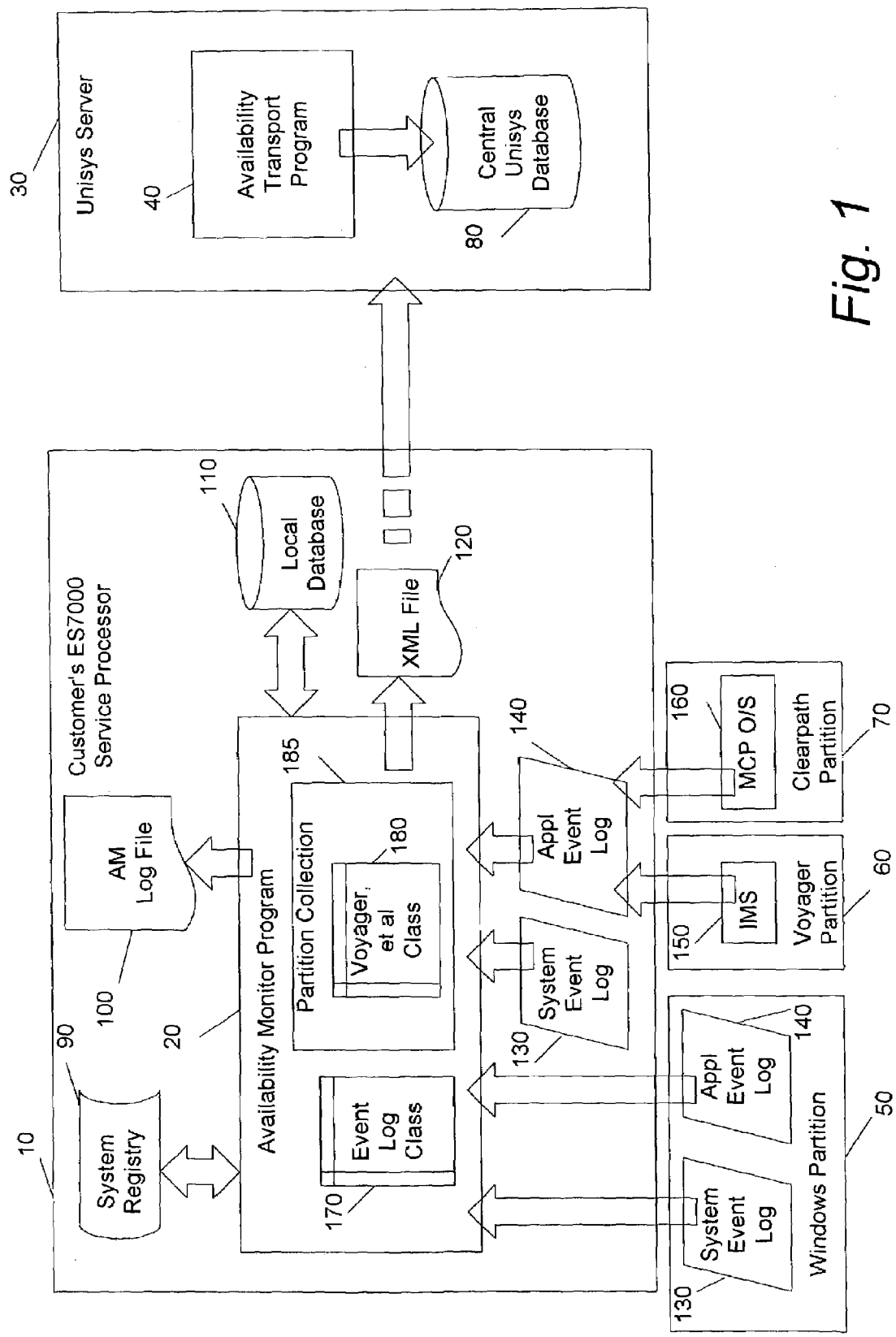
FIG. 1 is a diagram that shows the components of the Availability Monitor system modules.

1. Sentinel: The umbrella software package that contains Unisys value added software for the ES7000 systems; including an Availability Monitor program cited at item #6.

2. Event Log: A Microsoft Windows repository of critical and non-critical information pertaining to the system and applications. The Availability Monitor reads both the System and Application event logs to collect pertinent information for determining system stability and availability.

3. XML files: Extensible Markup Language, or XML, files are the means whereas Availability Monitor transports structured data between the customer's and Unisys systems through the Internet, or other connection methods.

4. Firewall: A set of programs residing on a "gateway server" that protect the resources of an internal network. A security system to protect a networked server or computer from intentional or accidental damage or unauthorized access; implemented by either hardware (a dedicated gateway machine) or software (defensive coding).

5. Availability: The percentage of a given time interval in which, a system is considered up and running.

6. Availability Monitor: A Unisys software program that collects customer availability and stability information and transports it to a central engineering group for system stability analysis.

7. CMP Collector (aka Availability Monitor): CMP Collector is an earlier name for the software program.

8. Customer Configuration: Within the Availability Monitor program, the customer is required to define his/her configuration of ES7000 systems and their subsequent Service Processor(s) and Partition(s). This configuration definition is then stored in a local database and is used within the program to determine which entities are available for the collection of stability information.

9. IMS (Integrated Maintenance System): Now referred to as Server Control. The purpose of IMS is to provide hardware and partition management for Unisys CMP Systems.

10. System Registry: A repository on Microsoft Windows systems containing information about a computer's configuration. The registry is organized hierarchically as a tree and is made up of keys and their sub keys and value entries. The registry is available for application programs such as the Availability Monitor to hold pertinent information about a user or machine profile so that it can be referenced on separate instantiations of the program.

11. Coupled Help: An application display technique in which help information is displayed in a window that exists separately from the main application, but is physically located immediately adjacent to it. If the user repositions the main application window and re-launches the coupled help, the help window will automatically reposition itself relative to the application window.

12. Help Window: An application window in which help information is displayed. The application window is a typical Microsoft Windows style dialog that is commonly used in graphic user interfaces.

13. Scan Event Logs: A process of steps which reads the Windows System and Application Event Logs on a service processor or partition and stores event information from these logs that is pertinent to determining system stability and availability into a local Microsoft Access database. The Availability Monitor program periodically runs this process on each accessible Service Processor or partition in the customer's configuration to collect stability data from each of the logs.

14. Last Scan Timestamp: A time and date property of a partition that exists in the PartitionInformation table of the Availability Monitor program's database. This timestamp depicts the time/date in which the Availability Monitor last scanned the event logs on a particular partition or service processor.

15. Class Module: A program object within the Availability Monitor that holds and filters pertinent stability event information that is read from Windows System or Application Event logs before storing it into a local Microsoft Access database.

16. Scan Criteria: In the Availability Monitor program, the criteria required to the scan event logs on a server. This scan criterion involves the IP address, operating system, and usercode and password, if required, of a server.

17. System Event log: A type of Windows Event Log that holds events logged by the system. These events could contain information about hardware, software, or system problems.

18. Application Event Log: A type of Windows Event Log, which holds events, logged by applications or programs on the system. It may contain messages, errors, warnings, and other information written to the log by applications. The application developer decides which events to record and what information to include in the various fields of the log. These fields include: Type, date, time, source, category, event, user, computer, and description.

19. PartitionInformation Table: A table in the Availability Monitor's local database that contains information about a partition or service processor within the customer's configuration. The information stored in this table consists of the following:
   On the system that the partition is associated with:
   The running operating system
   Whether the partition is currently marked to be scanned
   The partition's name
   The real computer name or IP Address of the partition
   Whether it requires a log in
   A usercode to log in with
   A password to log in with
   Whether it is a Service Processor or not
   The timestamp of the latest event read
   The timestamp of the last Scan Event Log
   The timestamp of the last stability data transport to a central engineering group 20. Event ID: An ID to indicate what type of event was read from either the Windows System or Application Event log. This ID is assigned by Availability Monitor when placed into the local database and is not necessarily the event ID from the Windows Event Log.

21. Voyager Partition: A CMP Server partition running the OS2200 operating system of Unisys Corporation.

22. ClearPath Partition: A CMP Server partition running the A-Series Master Control Program (MCP) operating system.

23. MIP Application Log: See Application Event Log.

24. CMP Server: A Cellular Network Processor (CMP) Server is an enterprise network server used for large-scale processing.

25. Partition: An independent operating system instance of a CMP Server.

26. Local Access Database: See Microsoft Access Database

27. Windows: A multi-tasking, multi-threaded operating system developed by Microsoft Corporation.

28. Windows based system: A system running the Windows operating system developed by Microsoft Corporation.

29. LAN Modem: A modem that enables a LAN to share Internet access over a 56K analog phone line.

30. Dial Modem: Acronym for modulator-demodulator, a modem is a device that enables a computer to transmit data over telephone lines. A dial modem has the capability to dial a phone number.

31. Retry Count: Within the Availability Monitor, the number of attempts made to establish a communication connection via LAN Modem or Dial Modem before giving up and returning an error.

32. CMP Transport (aka Availability Transport): A program installed on a Unisys server that parses the XML Files sent by the Availability Monitor at various customer sites and stores the data in a central SQL Server or Microsoft Access database.

33. XML File data: The data stored within an XML file and which is parsed by the CMP Transport program. The data contains configuration and stability information gleaned from a customer's CMP Server by the Availability Monitor program.

34. CMP Reporter: A program that organizes and generates stability data reports about running CMP Servers. The CMP Reporter accesses the central SQL Server or Microsoft Access database wherein the CMP Transport has previously stored customer stability data read from XML files sent by the Availability Monitor.

35. Opening DB: A procedure that connects the program to a database.

36. Tree/List Views: Within the CMP Reporter program, the tree view displays show customers, systems, and partitions that exist in a central database. The list view displays partition information about partitions that run under a selected CMP Server.

37. Customer/System Charts: Two types of report charts generated by CMP Reporter. Report charts can either be grouped by customers, including all their systems, or a single system.

38. MTBX: The Mean Time Between (MTB) events is the quotient of a time interval and the number of specific events that occurred inside that time interval.

39. Availability: The percentage of a given time interval in which, a system is considered up and running.

40. Stability Information (Stability Data): Information about a system that reflects some aspect of the system's availability and reliability. This information includes planned and unplanned system stops, system starts, and a variety of system errors.

41. Microsoft Access Database: Microsoft® Access™ is software which lets you create databases and programs to track and manage information. Two Access databases are employed in the Availability Monitor software. One database is created and maintained at the client site. It is used to store information, which is gathered from one or more client systems. This information is periodically sent to a central engineering group at a Unisys site. The second Access database is a central engineering database within Unisys, which can be used to store information from multiple client sites. This database is used to generate reports on the availability of the various client sites.

42. Configuration Information: Information about the levels and settings of various software and hardware components of a partition.

43. Event Logs: Logs that are maintained on a Windows operating system. They contain messages, errors, warnings, and other information written to the log by applications or system components. There are three types of event logs—Application, System, and Security. Each event in the log may contain the following information: Type, date, time, source, category, event, user, computer, and description.

44. Service Processor: A computer that controls the central electronics complex (CEC) hardware of the CMP server. The Service Processor runs the Server Control software, which controls and continuously monitors the hardware. The Service Processor runs software that supports system operations, administration, and management. A server can be equipped with up to two Service Processors, of which one is the master and the other is the standby.

45. Partition Configuration: See Configuration Information

46. Plateau Levels: The release level of a set of software and hardware files (known as a Plateau), which is run on the Service Processor of a CMP Server.

47. Operating System Information: Details about the operating system as recorded in the Windows registry. This includes the version, build number, name, type, and install date of the operating system.

48. Directory System Information: Details about the names of critical directory paths of a system as recorded in the Windows registry. This includes the Windows, system, and boot directories.

49. BIOS Information: Information about the basic input/output sub-system (BIOS) of a system as recorded in the Windows registry. This information includes the Date and Version of the BIOS.

50. Network Card Descriptions: A description of the network card(s) installed on a system as recorded in the Windows registry.

51. Hot Fix Information: A list of hot fix identifiers installed on a partition as recorded in the Windows registry. A hot fix is a fix provided by Microsoft to address a specific critical problem in the operating system software.

52. Event Information: Each event in an event log may contain the following information: Type, date, time, source, category, event, user, computer, and description.

53. FRU (Field Replacement Unit): The lowest level hardware component of a partition, which can be replaced/swapped out.

54. Registry Entries: Information stored in a database repository on a Windows system, known as the "Registry." The registry contains information that is continually referenced by the operating system and installed applications such as program information, property settings, and hardware descriptions.

55. Help Wizard: A Wizard is an application that walks a user through a multi-step process by displaying a sequence of windows or dialog boxes that either instruct the user, request information from the user, or inform the user of what operations are being performed.

56. Coupled HTML Help: A method for displaying an HTML Help window. This method attaches a window dedicated solely to display help information to the main application window. The Coupling of the windows refers to the fact that the help window will dynamically reposition itself on the screen so that it maintains its defined spatial relationship with the main window.

57. Multi-pane Dialog: The Availability Monitor uses a multi-pane or tri-pane dialog to display help menu contents. The following panes are included in the dialog:
   1. Toolbar Pane. This contains and manages the toolbar buttons. It is capable of sending notifications to the owner when buttons are pressed.
   2. Navigation Pane. This contains the ActiveX control that supports the Table of Contents, the Index, the Search dialog, and other features.
   3. Topic Pane. This displays HTML text and manages hyperlink navigation.

58. .chm file: Compiled HTML Help File. A file used by the coupled help. It is essentially a collection of HTML documents and all support files (such as images or sounds) that are used in the display of help. The HTML files contain all of the text that will be displayed in the help window, along with links to other documents and pictures.

59. Microsoft Access Database: A Microsoft created database, which contains a collection of information, related to a particular subject or purpose.

60. SQL Server: Microsoft® SQL Server™ is a relational database management and analysis system. The SQL Server database employed in the Availability Reporter software is used to house a central database sited within Unisys. This database is used to store availability information from multiple client sites from around the world. This database is used to generate reports on the availability of the various client sites.

61. Hardware Inventory: A list of hardware components of a system.

62. Microsoft Access Database: Microsoft® Access™ is software which lets you create databases and programs to track and manage information. Two Access databases are employed in the Availability Monitor software. One is created and maintained at the client site. It is used to store information, which is gathered from one or more client systems. This information is periodically sent to a central Unisys site. The second Access database is a central database within a Unisys site, which can be used to store information from multiple client sites. This database is used to generate reports on the availability of the various client sites.

63. Find Option: A feature in the CMP Reporter program that will help a user search for customers, systems, or partitions in the Tree View display.

64. BSOD (Blue Screen of Death): A commonly used acronym used to represent an error condition in Windows wherein the user's screen displays a blue background with white lettering. The nature of the error can vary, but it is typically a fatal error requiring a system restart or reboot.

65. Dr. Watson error: The information obtained and logged by Dr. Watson is the information needed by technical support groups to diagnose a program error for a computer running Windows 2000. A text file (Drwtsn32.log) is created whenever an error is detected, and can be delivered to support personnel by whatever method they prefer.

66. VME (Virtual Memory Error): An error that occurs when the operating system is unable to properly manage virtual memory for any number of reasons. Typically, a VME is reported when a system either runs out of Virtual Memory, or runs so low that the normal operation of one or more applications is in jeopardy.

67. Chkdsk: A Microsoft application that traditionally runs on a system after an improper shutdown. Chkdsk does both a physical scan of the hard drive, and a logical scan to ensure data integrity. Chkdsk also verifies other properties of the hard drive during its operation. Availability Monitor tracks Chkdsk executions since they relate to system stability.

68. Raw Availability: The calculation of availability based on all possible types of downtime.

69. Agreed Availability: The calculation of availability based on a subset of possible types of downtime, which are agreed upon by the service provider and the customer.

70. Task Scheduler: A Microsoft tool used to schedule tasks for recurring, automatic executions.

71. EventLogData Table: The EventLogData table is a table in the local database. It contains the following fields: PartitionNumber, SystemNumber, Event_ID, Event_Time, and Event_Description.

72. Tool Command Language (TCL): The TCL scripting language is used by Unisys to read and write to low level hardware units that are unreachable through other interfaces. The TCL script in a Unisys product is used to generate a list of the system's hardware inventory.

73. MIP (Management Interface Processor): See Service Processor. (Item #44).

74. Internal Data Store: It is data, which is stored internally in the program. It can take many forms from arrays, tables, or collections to name a few. It is temporary to the execution of the program. This is in contrast to external stores such as an Access database, where the data is stored external from the program and persists throughout multiple executions of a program.

75. Non-Fatal Dump: This dump is typically initiated by a user or program to force a dump of memory contents for some analytical purpose. The system continues to run after the dump is taken.

76. Fatal Dump: A fatal dump is part of an unexpected system failure. In this case a dump is initiated in the process of the system going down. The system must be restarted to recover from the failure. The dump may be used to determine the cause of the failure.

77. Unplanned Stop: An unplanned stop is a stop of the system, which the user has no control over. This could be due to a fatal program error, or the installation of a product, which requires a restart of the system.

78. Planned Haltload: A planned haltload is one which is purposefully initiated by the user.

79. Unplanned Haltload: An unplanned haltload is forced due to program error or the installation of software, which requires a restart of the system.

80. Clean Shutdown Event: A purposeful stop of the system by a user which brings down the system in an orderly manner.

General Overview:

The program described herein is installed on the Service Processor of each CMP Server, which is the Cellular Multi-Processor server developed by the Unisys Corp. It may optionally be installed on any system with network access to all Service Processors and Partitions of a group of CMP servers. It is to be run on a regular basis to extract stability information from the Windows Event Logs on the Partitions constituting the CMP server. This program can be invoked manually, by a script program, or by using the Windows Task Scheduler. In each case, the scanning and transfer are both initiated and controlled by the user. The frequency of use is expected to be approximately once a week, or more often in the case that the system logs might be overwritten more frequently or if more frequent monitoring is warranted.

The information that is extracted from the system logs is stored in a local database in Microsoft Access format on the Service Processor on which the software is installed. Configuration information is not stored locally but is generated and collected when the file is to be transferred.

As a separate function, the program involved here reads the information that is stored in the local database on the Service Processor and transports it to a central Unisys Engineering group on a regular basis. The information is written into an XML file and then transferred to a central engineering group through FTP. Prior to transmission, the data can be viewed and audited by the System Administrator. The XML file containing the data can optionally be copied to a floppy for transmission from a separate system, if desired. The frequency of transmission is expected to be approximately once a week and generally not as often as data is collected. The CMP Collector logs transmission activity to ensure successful transmissions.

At the time that the CMP Collector is directed to send stability data to the Unisys Central Engineering group, it first initiates a TCL script on the Service Processor to collect system inventory data. It then reads Registry entries on the Service Processor and the Partitions that are running Windows to collect additional system data. It also directly checks version levels of specified files on the Service Processor. The Availability Monitor Program includes the complete contents of the system inventory file and the information it has gathered separately into the XML file. The independently collected configuration information includes, but is not limited to:

1. IMS Internal Level (Information Management System)
2. IMS Release Level
3. Plateau Name
4. Plateau Version
5. SDS Level
6. Windows O/S Level
7. Windows Build Level
8. Windows Service Pack Level
HAL Version (Service Processor)

DESCRIPTION OF PREFERRED EMBODIMENT

Referring now to the drawings, and FIG. 1 in particular, a diagram is shown illustrating the components, which utilize the Availability Monitor program 20. The Availability Monitor Program (20) is installed on a customer's ES7000 service processor (10). The program interacts with the System Registry (90) by storing pertinent data to use across program runs. If there is something to communicate to the user (especially during unattended modes), the program utilizes a personal Log File (100) to report its activities and any pertinent information regarding errors or problems resulting in its tasks not being able to complete successfully.

The program 20 scans the Service Processor System Event Log (130) and Application Event Log (140) searching for information relative to the system's stability. In addition to scanning the local Service processor 10, the program 20 can be set up to scan partitions running the currently supported operating systems. Operating systems that are currently supported consist of Windows NT/Windows 2000/

Windows 2000 DataCenter (50), Voyager 2200 (60), and ClearPath MCP (70). On the Windows family of operating systems, the System Event Log (130) and Application Event Log (140) are scanned for information. For Voyager partitions, IMS (150) directly writes stability information into the Service Processor's Application Event Log (140). The MCP operating system (160) also writes ClearPath partition stability information into the Service Processor's Application Event Log (140). The event log information is filtered and temporarily stored into the program's internal Event Log Class (170) and Voyager Event Log Class (180). The "Event Log Class" contains data and functions related to the event log. The Voyager Event Log class is similar but tailored to the specifics of a Voyager event, as was discussed in the cited co-pending Application, U.S. Ser. No. 10/308,388.

Once the information is collected into the appropriate classes, this stability information is interpreted and stored in a local stability database (110) that also resides on the customer's ES7000 Service Processor (10). When the Availability Monitor program 20 is ready to transport the stability data to the Unisys server (30), it reads the local database (110) and records any data not yet sent into an XML file (120). This XML File (120) is transported to a public server (30) and fetched from across the firewall by the Availability Monitor Transport program (40) and stored in a central Unisys database (80). From this location, Unisys executives and engineers can extricate reports on the information therein to proactively view each customer's system availability.

Figure 2B:
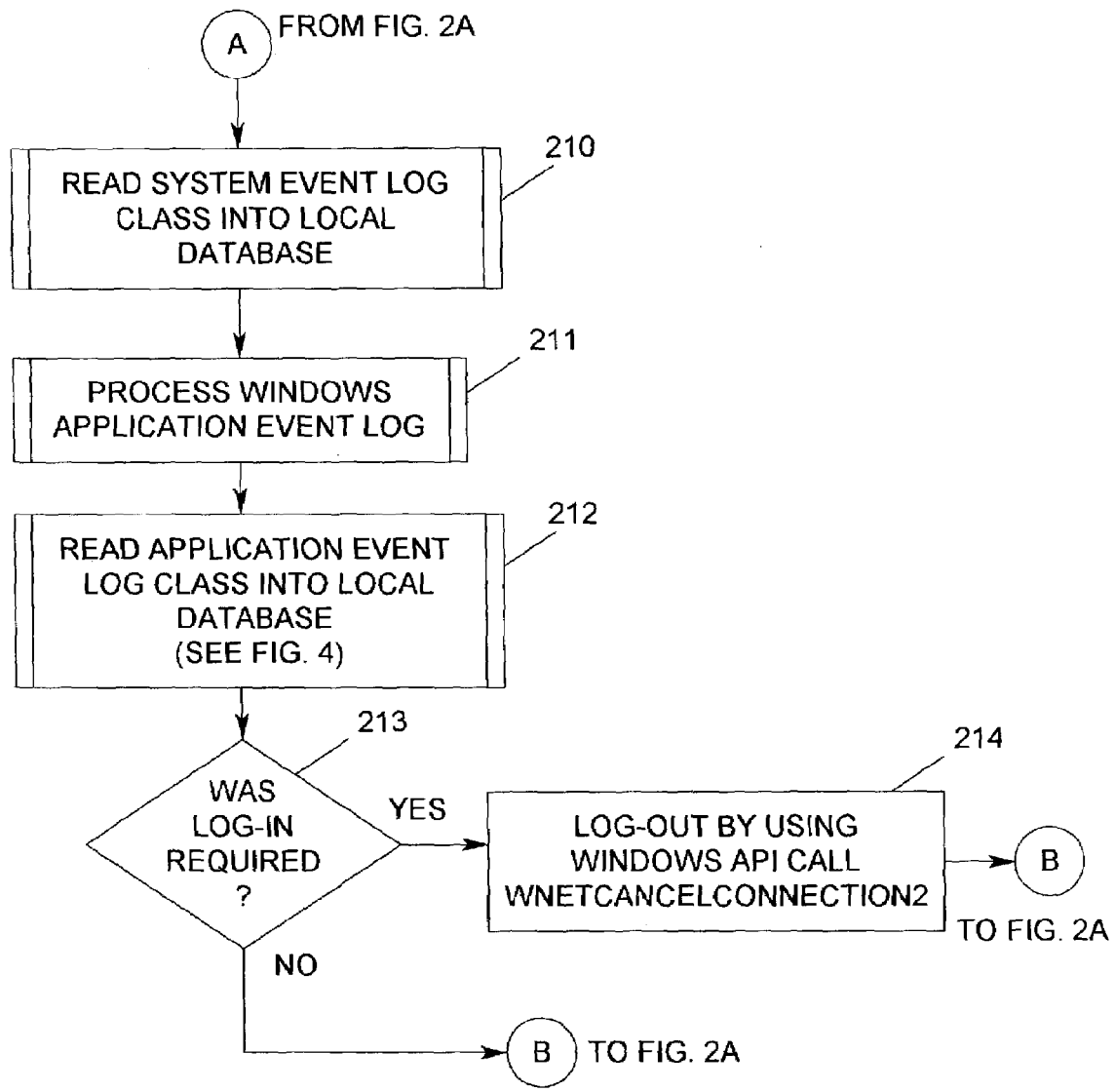

FIGS. 2A and 2B show the pre-processing for storing information that is to be scanned.

Referring now to FIG. 2A, which begins with start bubble 200. A process to fill out a Voyager/ClearPath partition collection data store is initiated at step 201. This internal data store is used later to determine which of the partitions to gather information from. A full description of this process is detailed in FIG. 3. Next, since there are a number of partitions/service processors created in a Cellular Multi-Processor (CMP) ES7000 (process 204), the steps following that are performed for each partition/service processor to be scanned. An inquiry is then made to determine if the selected partition/service processor is accessible with the information given by the user at set-up time (Diamond 205). If the partition is accessible (Yes), the process continues to inquiry 206 to check if the operating system is a Windows Operating System (Diamond 206). This is done by comparing what was given by the user at set-up time to each known operating system type. If the answer to inquiry 206 is No, and the operating system is not Windows, an inquiry (Diamond 202) is initiated to check if there are other partitions to step through. If there are no more partitions (No), the process ends at bubble 203. If there are more partitions to step through (Yes), the process returns to step 204 in which sequential steps are performed for each partition/service processor.

If the answer to inquiry 205 is No, and the partition service processor is not accessible, another inquiry is made at step 202 to check if there are more partitions to step through. If there are no more partitions (No), the process ends at bubble 203. If, at step 202, there are more partitions to step through (Yes), the process returns to step 204 after which sequential steps are performed for each partition/service processor.

If the answer to inquiry 206 is Yes, and the operating system is Windows, another inquiry is made at step 207 to check if a log-in (consisting of a username and password provided by the user at set up time) is required. If a log-in is not required (No), the Windows System Event Log (130) is processed at step 209, and then proceeds via connector A to FIG. 2B. If the answer to inquiry 207 is yes, and a log-in of the username and password provided by the user at set up time is required, another inquiry is made at step 208 to check if the log-in is successful after entry of the username and password. If log-in is successful (Yes), the Windows System Event Log (130) is processed at step 209, (as described in FIG. 4 of U.S. Ser. No. 10/308,388, and continues to connector A in FIG. 2B. If the log-in was not successful (No) at inquiry 208, another inquiry diamond 202 is made to check if there are more partitions to step through. If there are no more partitions (No), the process ends at bubble 203. If there are more partitions to step through (Yes), the process returns to step 204 after which sequential steps are performed for each partition/service processor.

Figure 4:
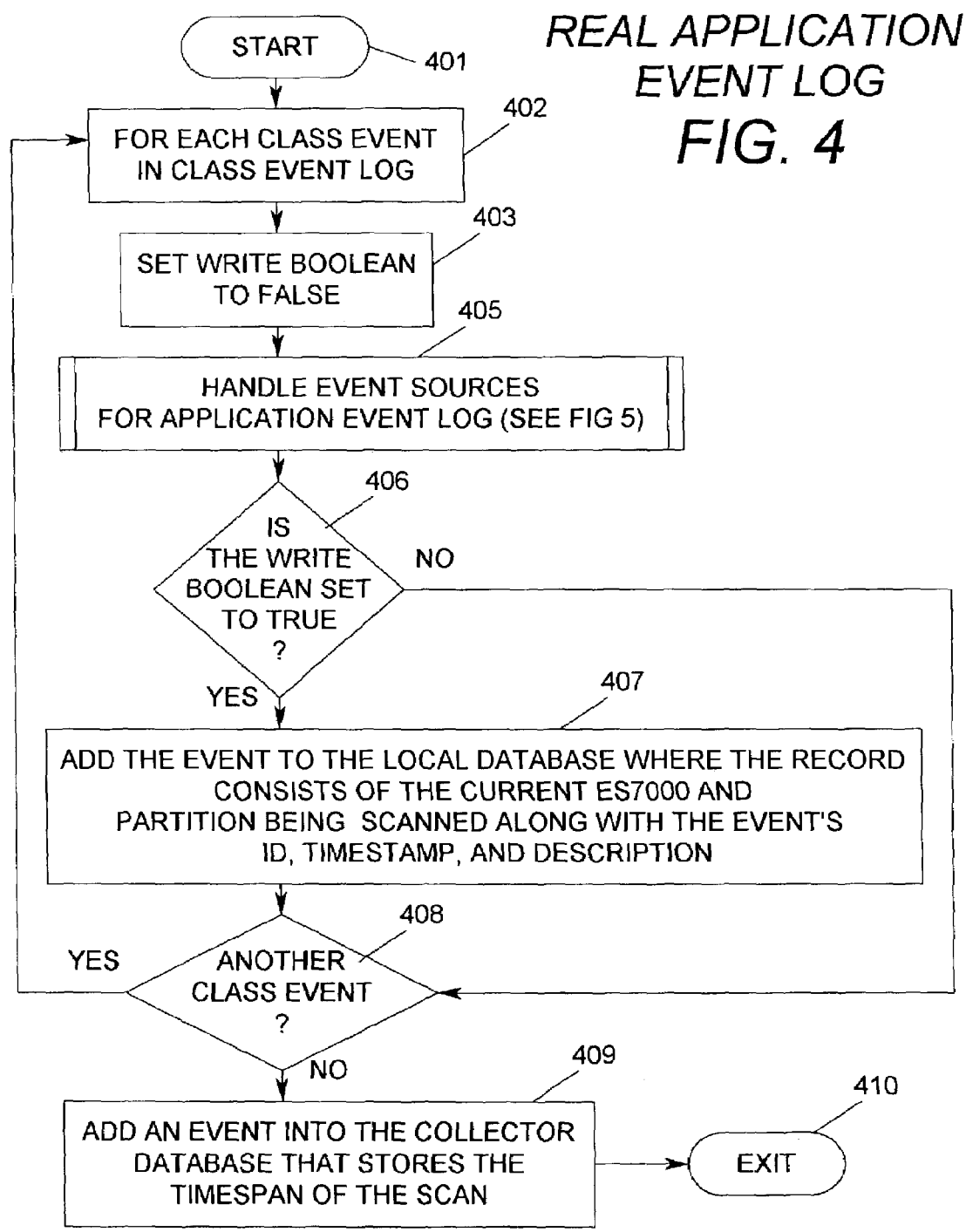
FIG. 4 is a flowchart that shows the process for processing the Windows application event log, which contains event information for several partition types, including Voyager and ClearPath.
Figure 5:
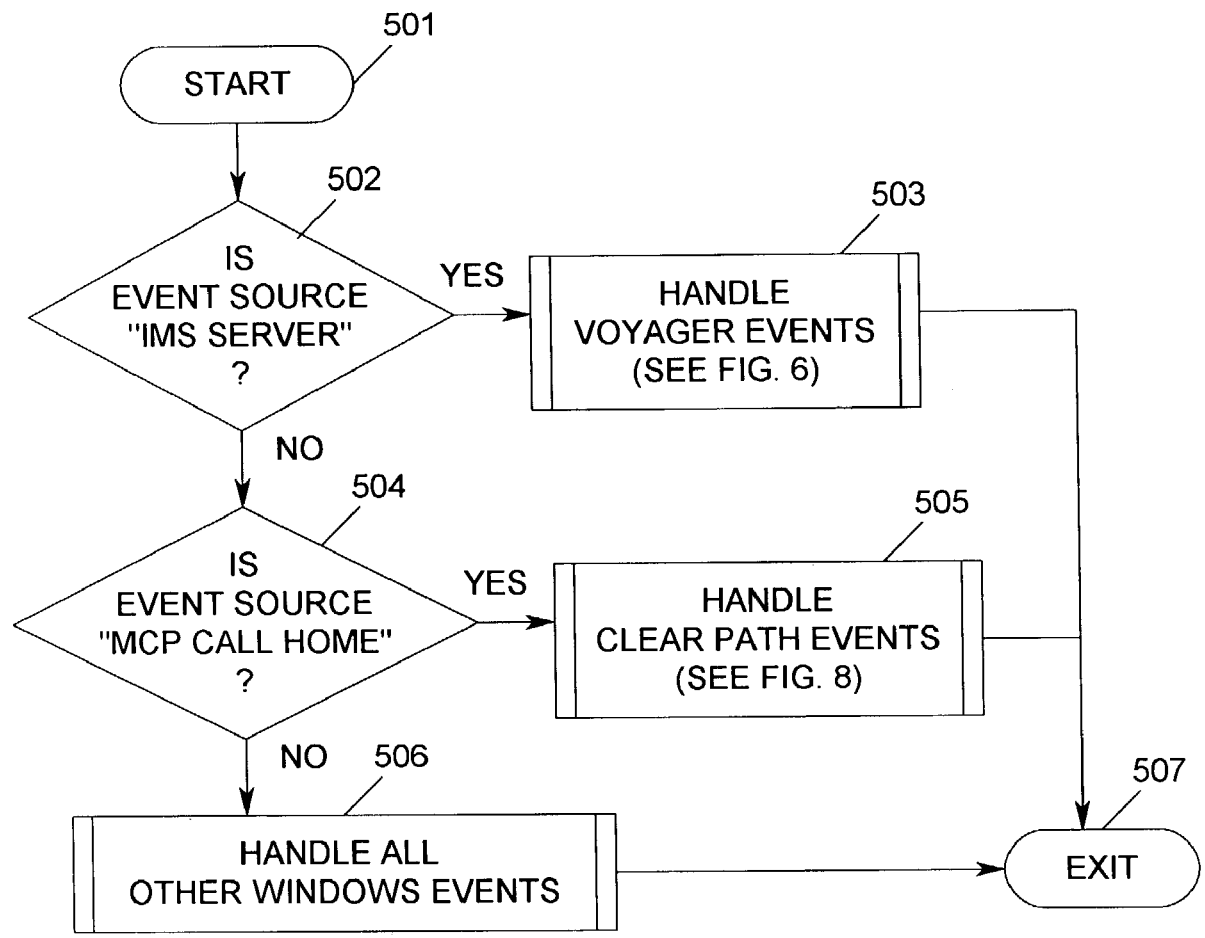
FIG. 5 is a flowchart illustrating the process for handling event sources for the application log.

Referring now to FIG. 2B, which starts with a process to read the newly created System Event Log class into a local database (step 210), (as described in FIG. 5 of U.S. Ser. No. 10/308,388. Next, the Windows Application Event Log is processed into a more stability relevant defined Application Event Log class at step 211, as shown in FIG. 4 of U.S. Ser. No. 10/308,388. At step 212, the Application Event Log Class is read into the local database (110) (as indicated in FIG. 4 of U.S. Ser. No. 10/308,388. An inquiry is then made at step 213 to check if a log-in was required to access this particular partition/service processor. If a log-in was not required (No), the process continues via connector B to FIG. 2A to repeat these steps for other partitions or Service Processors. If a log-in is required (Yes), then the program will log out of the currently scanned partition/service processor by using the Windows API call WnetCancelConnection2, which is initiated at step 214, which is continued via connector B to FIG. 2A.

Figure 3:
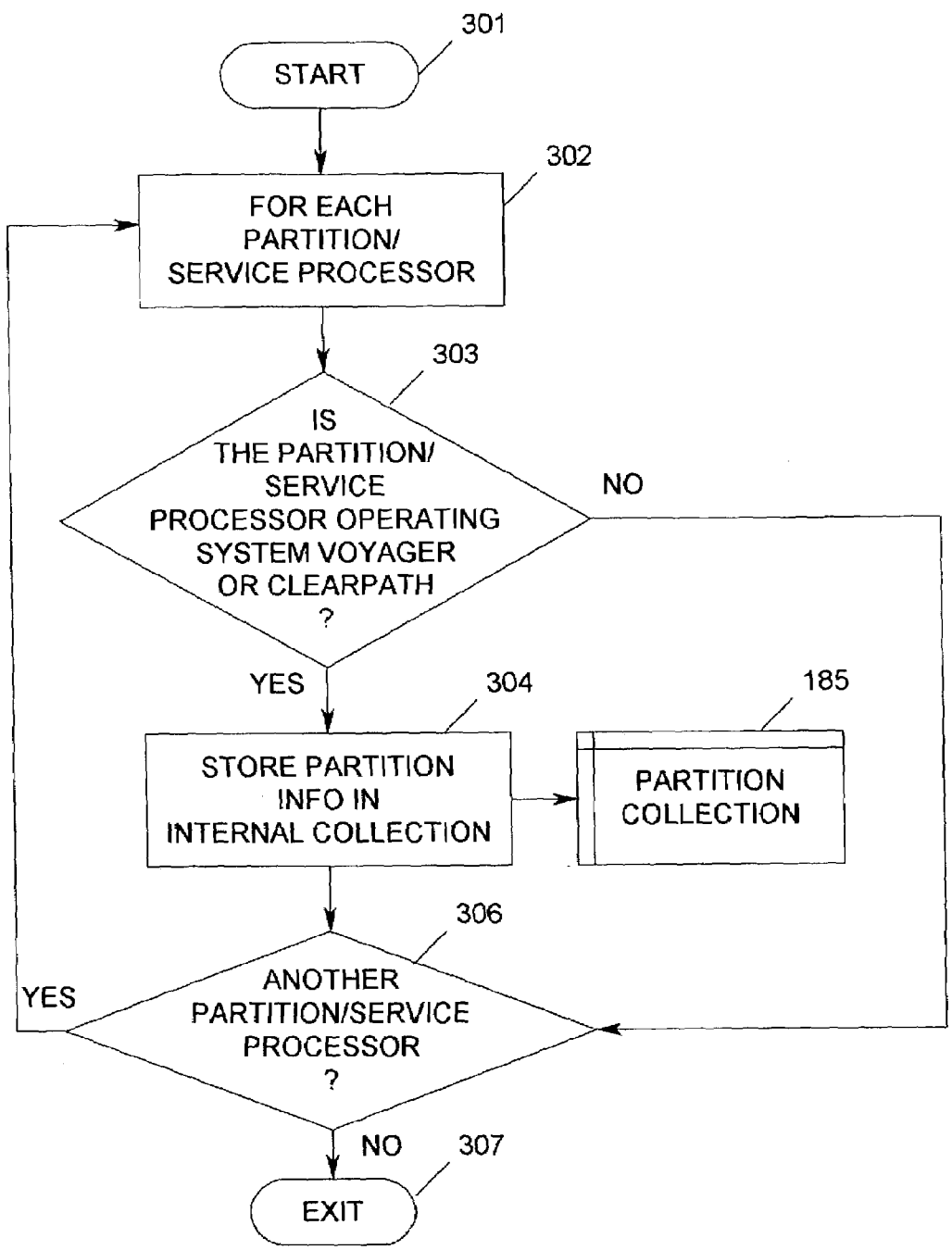
FIG. 3 illustrates the pre-processing involved to store information about any Voyager or ClearPath partitions that are to be scanned.

Referring now to FIG. 3, which begins with start bubble 301. Actions are performed for each partition/service processor (process 302). An inquiry is then made (Diamond 303) to determine if this partition is a Voyager or ClearPath partition. This is done by looking at the operating system type (osType) in the PartitionInformation record for that partition. A value of "4" indicates Voyager, and a value of "7" indicates ClearPath. These values are internal representations in the database, based on how the partition was defined to the system. Programmatically, the constants cOSVoyager and cOSClearPath are used to check for these values. If the partition type is something other than Voyager or ClearPath (No), the process continues to step 306 to check if there is another partition/service processor. If the partition is of type Voyager or ClearPath (Yes) in inquiry 303, the process continues to step 304, where a process to store the PartitionNumber, the ComputerName, the SystemNumber, and the LastSample from the PartitionInformation record into a new class object (clsVoyager). This class object then gets added to a collection of partitions (colPartitions). This partition collection is represented by step 185 in FIG. 1. An inquiry is then made at step 306 to check if there are more partitions to step through. If there are more partitions (Yes), the process returns to step 302 to perform steps for each partition/service processor. If there are no more partitions (No), the process exits at bubble 307.

Referring now to FIG. 4, which begins with a start bubble 401. For each class event in the class event log, a sequence of steps are performed (step 402). The write Boolean (bWriteEntry) is set to FALSE at step 403. This Boolean will be used later in the method to determine if the current event is to be written to the local database. The process then continues to step 405, which handles event sources for the application event log, which is detailed more in FIG. 5. An inquiry is then made at step 406 to check if the write Boolean (bWriteEntry) is set to TRUE. If the write Boolean is set to true (Yes), a process to add an event into the EventLogData table of the local database that contains the time span of this scan of the Windows Application Event Log is performed (step 407). The time span consists of the oldest and the newest generated event that is in the log. The process then continues to make another inquiry to check if there is another class event (step 408). If there are more class events (Yes), the process returns to step 402 to perform process steps for each class event in class event log. If there is not another class event (No), another event is added into the local database (110) that stores the timespan of the scan at step 409. The process then exits at bubble 410.

If the answer to inquiry 406 is No, and the write Boolean is set to FALSE, inquiry 408 is initiated to check for another class event. If there are more class events (Yes), the process returns to step 402 to perform steps for each class event in the class event log. If there is not another class event (No), another event is added into the local database (110) that stores the timespan of the scan at step 409. The process then exits at bubble 410.

Figure 7:
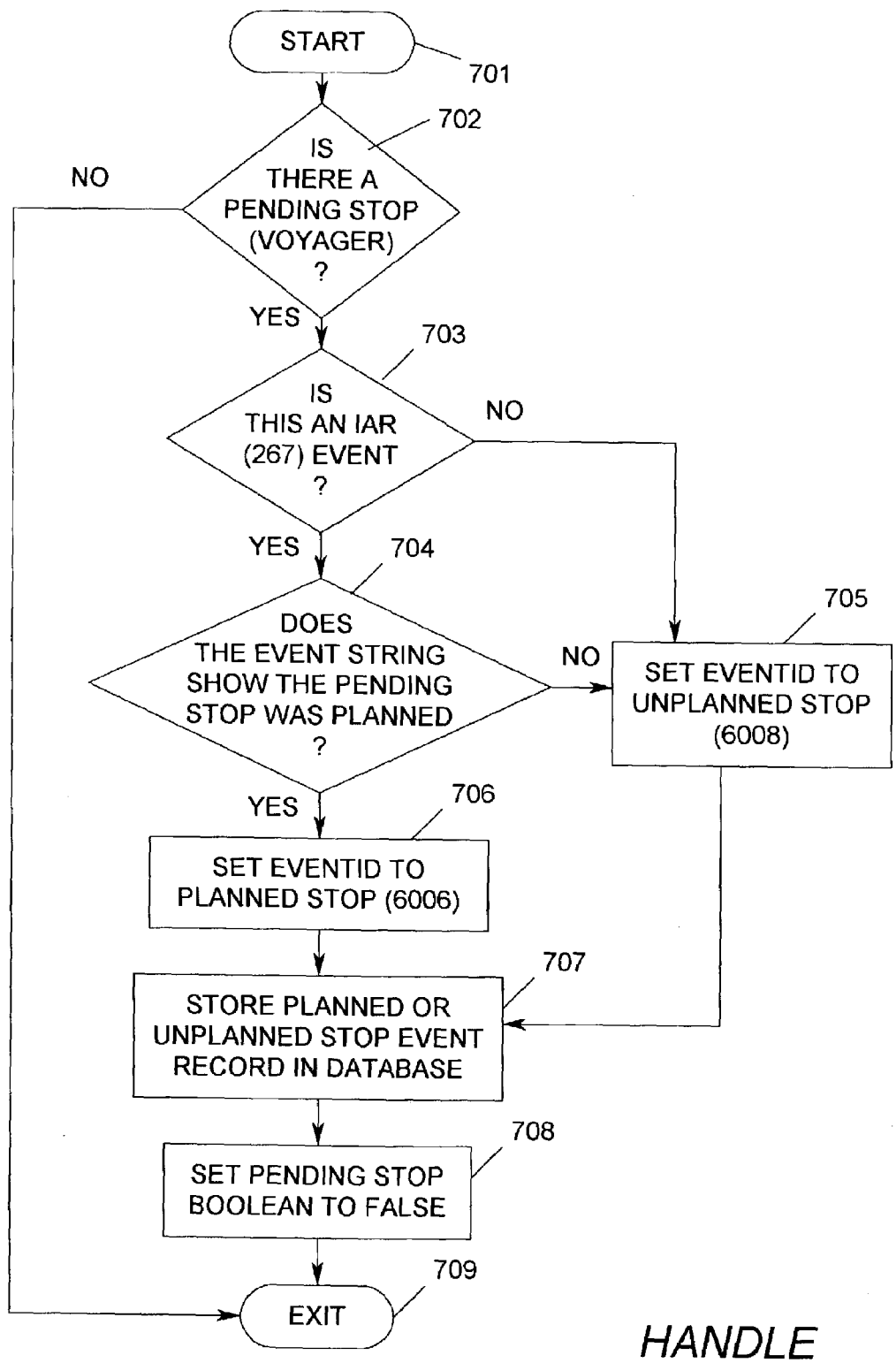
FIG. 7 is a flowchart illustrating the process for handling pending stops for Voyager events.

Referring now to FIG. 5, which begins with start bubble 501. This begins with an inquiry (step 502) to determine if the event is from a Voyager partition. This is done by looking at the Source item in the application event log. A value of "IMS Server" indicates a Voyager partition event. If the event is from "IMS Server" (Yes), the process continues to step 503, where Voyager events are handled, and then once complete, exited at bubble 507. If the event is from somewhere other than "IMS Server" (No), the process proceeds to make another inquiry at step 504 to determine if the event is from a ClearPath partition. This is done by looking at the Source item in the application event log. A value of "MCP Call Home" indicates a ClearPath partition. If the event is from "MCP Call Home" (Yes), the process continues to step 505, where the ClearPath events are handled and the process exits (bubble 507). The handling of ClearPath events are illustrated in more detail in FIG. 8. If the event source is something other than "MCP Call Home" (No), all other Windows events are handled (step 506) and the process then exits at bubble 507. Step 506 is indicated in FIG. 7 of U.S. Ser. No. 10/308,388. Specifically, there are: Fault Event; Unisys CODEVENT; Dr. Watson; and Certification Advisor.

Figure 6:
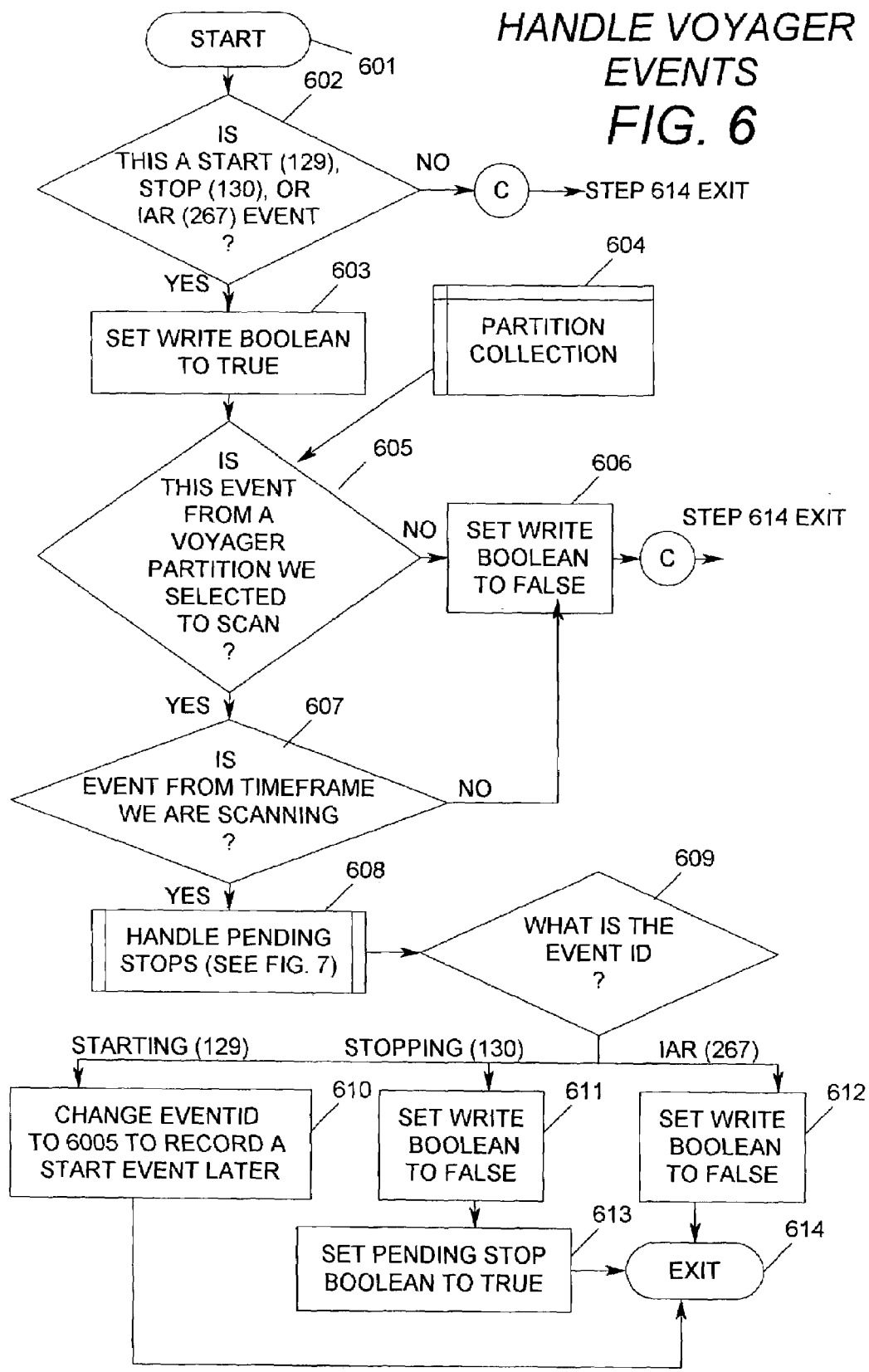
FIG. 6 illustrates the process for handling Voyager events.

Now referring to FIG. 6, showing the process for handling Voyager events is shown and begins with a start bubble 601. Since this process only operates on certain event types, an inquiry is made at step 602 to check whether the current event for this Voyager partition is a start (EventID=129), a stop (EventID=130), or an Initiate Auto Recovery (IAR) (EventID=267). If the event is none of the above (No), the process continues to a connector (C), which exits at step 614. If this event is a start, stop, or IAR (Yes), a process to set write Boolean to TRUE is initiated at step 603. This indicates that the event is a potential candidate to be written to the local database (110). An inquiry is then made to determine if this event is from a Voyager partition that is being scanned. This is done by comparing the computer name in the partition collection (item 305, FIG. 3) to the computer name field in the application log record. If the partition is not in the collection (No), the write Boolean is set to FALSE at step 606, and is connected via (C) to exit bubble 614. If the partition is in the collection, (604) indicating it is to be scanned (Yes), the process continues to step 607.

An inquiry is then made at step 607 to determine if the event is from the selected timeframe that is being scanned. If the answer to inquiry 607 is no, the write Boolean is set to FALSE (step 606), and is connected to exit at bubble 614. If the answer to inquiry 607 is yes, a process to handle pending stops is performed (step 608), as indicated in FIG. 7. Stop events should be followed by an IAR event, which can define whether the preceding stop was planned or unplanned. For this reason, stop events are not stored when the initial stop event is encountered. Instead, a pending stop is created. How the current event is handled is dependent on whether a pending stop has been noted. This process is detailed in FIG. 7.

Another inquiry is then made at step 609 to check the event ID. There are three different event types which have been filtered through, and each one requires different processing. For start events (EventID=129) step 610 is initiated to change EventID to 6005 to record a start event later, which then exits at bubble 614. For stop events (EventID=130) step 611 is initiated to set the write Boolean to FALSE, and then set the pending stop Boolean to TRUE (step 613), which then exits at bubble 614. For IAR events (EventID=267) step 612 is initiated to set write Boolean to FALSE to indicate that the record will not be written to the local database. (IAR events are only used to help define the preceding stop, they are not individual events stored in and of themselves).

Now referring to FIG. 7, which begins with start bubble 701. An inquiry is made at step 702 to check to see if there is a pending stop, by checking the StopPending Boolean for a value of TRUE. If there is not a pending stop to handle (No), the process exits at bubble 709. If there is a pending stop to handle (Yes), the process continues to inquiry 703 to check if this is an IAR event (EventID=267), which describes the pending stop. An IAR event is used to Initiate Automatic Recovery, which indicates the reason for the previous stop.

If it is an IAR event (Yes), another inquiry is made at step 704 to determine if the pending stop was planned or unplanned. This is done by parsing through the description field of the Application Log Event record. This string contains several pieces of information including a class code. A class code of 7 (operator reboot) or 10 (shutdown) indicates a "planned" stop. All other class codes indicate an "unplanned stop". If the pending stop was planned (Yes), the EventID is set to Planned Stop (EventID=6006) at step 706. Next, the planned or unplanned stop event is added into the EventLogData table of the local database (110) at step 707. Each record consists of the SystemNumber, PartitionNumber, Event_ID, Event_Time, and Event_Description. The pending stop Boolean is then set to FALSE at step 708, which then exits the process at step 709.

If the pending stop at step 704 is unplanned (No), the EventID is set to indicate an unplanned stop (EventID=6008) at step 705. The process then continues to step 707 where the planned or unplanned stop event is added into the EventLogData table of the local database. The pending stop Boolean is then re-initialized to FALSE to clear the pending stop at step 708, which then exits the process at step 709.

Since the method of the present invention is concerned with collecting Stability and Availability data, that data is then used to compile numerous reports about the availability of the various system(s). The reports that are generated include how long a system was up and running, versus how long it was down, as well as the number of stops a system experienced. Counting these stops and being able to identify them as planned or unplanned is an integral part of what the method does in providing essential operating information.

Figure 8:
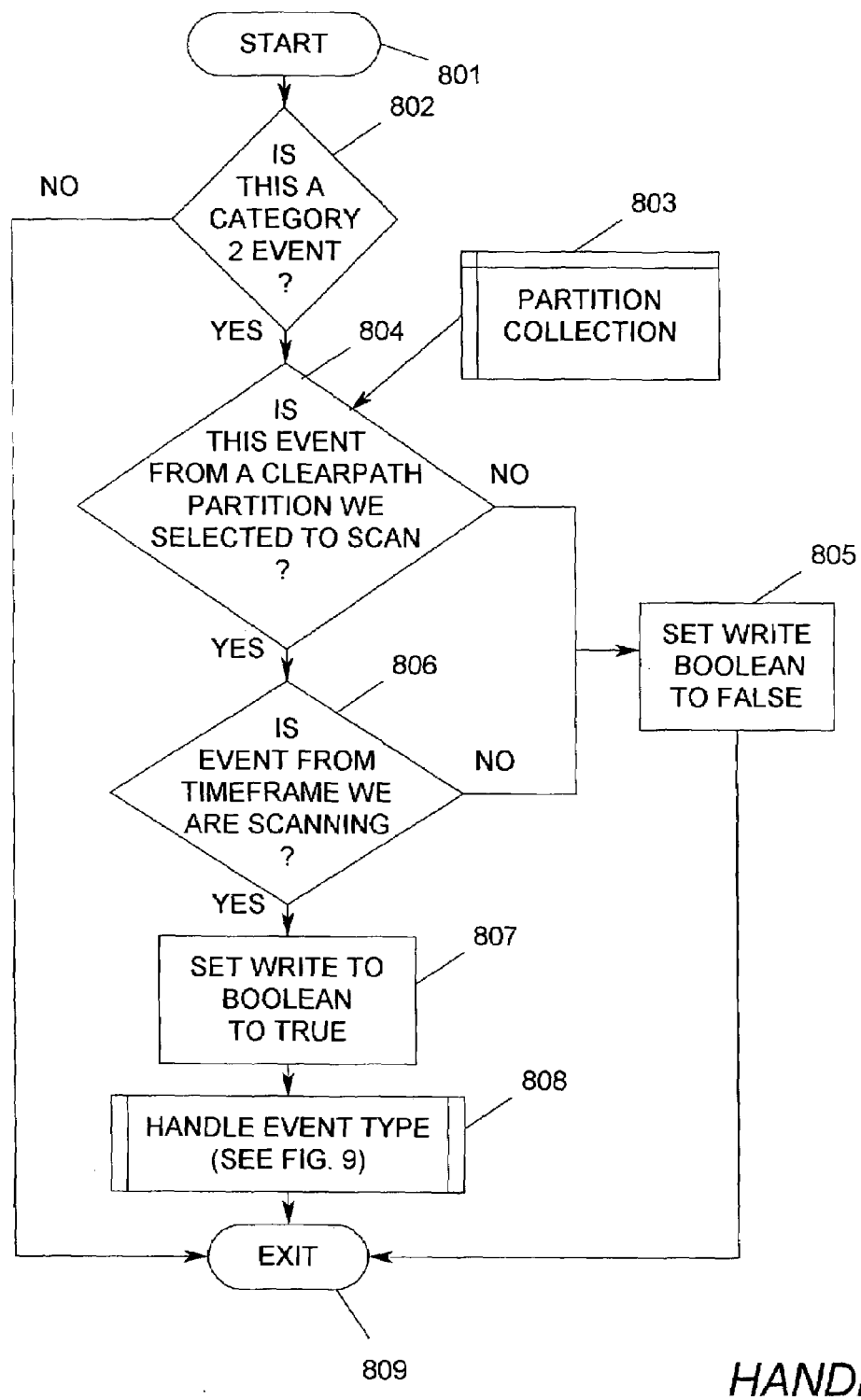
FIG. 8 illustrates the process for handling ClearPath events.

Referring now to FIG. 8, which begins with start bubble 801. This process only operates on certain special event categories. An inquiry is made at step 802 to check that the category of the ClearPath event is equal to "2", which indicates that this is an event intended for processing by this method. If this is not a category "2" event (No), the process exits at bubble 809. If this is a category "2" event (Yes), the process continues to step 804.

An inquiry is made at step 804 to determine if this event is from a ClearPath partition that was selected to be scanned. This is done by comparing the computer name in the partition collection (803) to the computer name field in the application log record. If the answer to inquiry 804 is No, indicating the ClearPath partition is not to be scanned, the write Boolean is set to FALSE (step 805) to indicate we are not interested in this event, and then exits at bubble 809. If the partition does exist in the collection, indicating it is to be scanned (Yes), the procedure continues to step 806. An inquiry is then made at step 806 to determine if the event is from the time frame being scanned. If the event time is within the timeframe (Yes), the procedure continues to step 807 where the write Boolean (bWriteEntry) is set to TRUE. This indicates that the event is to be written to the local database (110). The Event Type is then handled at step 808, where this handling is detailed in FIG. 9. The process then exits at bubble 809. If the answer to inquiry 806 is no, the write Boolean is set to FALSE at step 805, and then exits the process at bubble 809.

Referring now to FIG. 9, which begins with a start bubble 901. An inquiry is made at step 902 to check what the EventID is. There are four different event types which are possible for ClearPath partition events. Each one requires different processing routines. For non-fatal dumps (EventID=3000) the process goes to step 903. For fatal dumps (EventID=3001) the process goes to step 904. For haltloads (EventID=3002) the process goes to step 905. For tracking the reason for haltloads (EventID=3003) the process goes to step 906.

Referring now to a non-fatal dump event (3000). An inquiry is made at step 903 to determine if there is a stop time associated with this event. This is done by parsing through the event description string and looking for a value following a string of "StopTime=". If there is a stop time (Yes), the process continues to step 907. Otherwise, (No) the process goes to step 912.

Step 907 adds a non-fatal dump event (EventID=3000) into the EventLogData table of the local database (110). Each record consists of the SystemNumber, PartitionNumber, Event_ID, Event_Time, and Event_Description.

Step 911 adds an "unplanned" stop event (EventID=6008) into the EventLogData table of the local database (110). Each record consists of the SystemNumber, PartitionNumber, Event_ID, Event_Time, and Event_Description.

Step 912 performs an inquiry to determine if there is a start time associated with this event. This is done by parsing through the event description string and looking for a value following a string of "StartTime=". If there is a start time (Yes), the process continues to step 913. Otherwise, the process exits at bubble 918.

Step 913 adds a start event (EventID=6005) into the EventLogData table of the local database. A start event indicates that the system has started up again after being down for whatever reason. Each record consists of the SystemNumber, PartitionNumber, Event_ID, Event_Time, and Event_Description. The process then exits at bubble 918.

Referring now to a fatal dump (3001). An inquiry is made at step 904 to determine if there is a stop time associated with this event. This is done by parsing through the event description string and looking for a value following a string of "StopTime=". If there is a stop time (Yes), the process continues to step 908 where a fatal dump event (EventID=3001) is added into the EventLogData table of the local database. Each record consists of the SystemNumber, PartitionNumber, Event_ID, Event_Time, and Event_Description. Otherwise, the process exits at bubble 918.

Referring now to a haltload (3002). An inquiry is made at step 905 to determine if there is a stop time associated with this event. This is done by parsing through the event description string and looking for a value following a string of "StopTime=". If there is a stop time (Yes), the process continues to step 909. Otherwise, the process exits at bubble 918.

Step 909 determines if the haltload was planned or unplanned. This is done by looking for a sub-string of "HaltLoadReason=FATAL DUMP" in the event description. It will set the EventID to 6008 to indicate an "unplanned" stop if the FATAL DUMP sub-string is found. Otherwise, it will set the EventID to 6006 to indicate a "planned" stop. The process then continues to step 914.

Step 914 adds a planned or unplanned stop event (EventID=6006 or 6008) into the EventLogData table of the local database. Each record consists of the SystemNumber, PartitionNumber, Event_ID, Event_Time, and Event_Description. The process then continues to step 915.

Next, step 915 makes an inquiry to determine if there is a start time associated with this event. This is done by parsing through the event description string and looking for a value following a string of "StartTime=". If there is a start time (Yes), the process continues to step 917. Otherwise, the process exits at bubble 918.

Step 917 adds a start event (EventID=6005) into the EventLogData table of the local database. Each record consists of the SystemNumber, PartitionNumber, Event_ID, Event_Time, and Event_Description. The process then exits at bubble 918.

Now referring to tracking haltloads (3003). An inquiry is made at step 906 to determine if there is a stop time associated with this event. This is done by parsing through the event description string and looking for a value following a string of "StopTime=". If there is a stop time (Yes), the process continues to step 910. Otherwise, the process exits at bubble 918.

Step 910 determines if the haltload was scheduled and if the causation responsibility is attributed to the site or to the Unisys Central-Engineering group. This is done by parsing through the event description string. To determine if the haltload was scheduled, the program looks for a sub-string of "HaltLoad=Scheduled". If this is found, the output description field is set to include the sub-string "37100". This indicates a scheduled haltload. If a sub-string of "HaltLoad=Unscheduled" is found, then the output description field is set to include the sub-string "37000" to indicate an unscheduled haltload. The output description field is used to indicate the description field in the EventLogData table, which is the output side of the processing. To determine the responsibility for the haltload, the program looks for a sub-string of "HaltLoadAssignment=". The responsibility for the haltload indicates whether the haltload should be attributed to the central Unisys engineering group or to the customer. If a reboot is necessary to repair failing hardware or to install a software update of a type of Unisys software, for example, it should be attributed to a central Unisys engineering group. If the reboot is to add or reconfigure hardware or to install new user software, it should be attributed to the customer. The value following this is used to specify "Site" or some other value. This value is appended to the output description field. The process then continues to step 916.

Step 916 stores an operator clean shutdown event (EventID=1074) into the EventLogData table of the local database (110). Each record consists of the SystemNumber, PartitionNumber, Event_ID, Event_Time, and Event_Description. The process then exits at bubble 918.

Described herein has been a method for collecting stability data from various partitions of a Cellular Multi-Processor Server and its associated service processor. The data is collected in a database to show various aspects of the systems' availability and reliability. The method is specially focused on gathering data on two specialized proprietary operating system partitions designated as the Voyager and ClearPath. Variously selected time periods of event entries can be gathered and stored for subsequent analysis.

While a preferred embodiment has been illustrated herein, it should be understood that other embodiments are possible which still fall within the scope of the invention, as shown in the attached claims.

What is claimed is:

1. In a cellular multi-partitioned server of multiple and different partitioned operating systems which communicate with a Service Processor, a method for collecting event data from first (A) and second (B) specialized partitions comprising the steps of:
   (a) reading through an Application Event Log of said Service Processor;
   (b) scanning for event entries from said first and second specialized partitions, which cover a selected timeframe period, wherein said first and second specialized partitions respectively include proprietary operating systems designated as Voyager and ClearPath;
   (c) parsing of said event entries;
   (d) storing said event entries in a local Access database (110).

2. The method of claim 1 wherein step (d) includes the step of:
   (d1) establishing an Event Log Data Table from said event entries stored in said local database.

3. The method of claim 1 which further includes the step of:
   (e) transmitting, at prescribed intervals, said event entries to a central engineering database.

4. A method for gathering stability information from each partition of a Cellular Multi-Processor (CMP) which is in communication with a Service Processor, wherein unique steps are required to collect event data from certain specialized partitions A and B having operating systems different from Windows Operating Systems, said method comprising the steps of:
   (a) checking each partition and Service Processor to see if it includes said specialized partitions A or B, wherein said specialized partitions A and B respectively include proprietary operating systems designated as Voyager and ClearPath;
   (b) collecting partition information via scanning about specialized partitions A and B for storage in a collection module;
   (c) looping through all system partitions and service processors looking for a Windows Operating System, and if so;
   (d) accessing said Windows Operating System with a username password login;
   (e) processing the Windows System Event Log into a set of defined System Event Log Classes;
   (f) reading the newly-created System Event Log Class into a local database (110);
   (g) processing the Windows Application Event Log into a specially-defined Application Event Log Class;
   (h) reading said newly-created Application Event Log Class into said local database (110).

5. The method of claim 4 wherein step (b) includes the steps of:
   (b1) checking to see if there are more of said specialized partitions to scan through, and if not;
   (b2) ending the sequence if no more partitions are available to scan through.

6. The method of claim 5 wherein step (b1) indicates more partitions are available to scan through and then further includes the steps of:
   (b1a) for each partition, checking the partition and Service Processor to see if it includes said specialized partitions A and B;
   (b1b) collecting the event entries from said specialized partitions A and B for storage in a collection module.

7. In a Cellular Multi-Processing System having multiple and different operating systems communicating with one or more Service Processors, a system for gathering stability information from each partition and Service Process comprising of:
   (a) first means for gathering event data from those partitions using Windows Operating (OS) Systems;
   (b) second means for gathering event data for non-Windows OS including specialized Operating Systems A and B using information stored on the service processor, wherein said specialized Operating Systems A and B respectively include proprietary operating systems designated as Voyager and ClearPath;
   (c) means for collecting said event data from said Windows Operating Systems for placement into a collection module;
   (d) means for processing said event data into created logical classes with compatible formats;
   (e) means for transmitting said created logical classes to a local database.

8. In a Cellular Multi-Partitioned server of multiple and different partitioned operating systems which communicate with a service processor, a method and program storing event information about specialized partition A (voyager) and B (ClearPath) which are to be scanned, comprising the steps of:
   (a) selecting a partition for scanning of events;
   (b) determining if the partition is either a specialized A (Voyager) partition or a specialized B (ClearPath) partition, and if so;
   (c) storing the Partition Number, Computer Name, System Number and Last Sample into a new Class Object;
   (d) adding said Class Object to a partition collection as an internal storage object of the program;
   (e) completing steps (a) through (d) for each other ones of said specialized partitions.

9. The method of claim 8 wherein step (b) includes the steps of:
- (b1) recognizing the number "x" as indicating a specialized A (Voyager) partition, or;
- (b2) recognizing the number "y" as indicating a specialized B (ClearPath) partition.

10. In a network of multiple partitioned operating systems which communicate with a Service Processor, a system for scanning and collecting Event Information from Windows Event Logs on each Windows operating System (OS) and Service Processor comprising:
- (a) means to scan each of said Windows Event Logs in each Windows Operating System and each Service Processor;
- (b) means for determining if each Event is associated with a Partition/Service Processor running either a specialized A (Voyager) OS or specialized B (ClearPath) OS, and if so;
- (c) means for storing partition information in an internal partition-collection;
- (d) means to create an Event Log Data Table in a local database (110) to which events can be added;
- (e) means for adding Event information to said Event Log Data Table which falls within a specified time span;
- (f) Means for determining if an Event is from a Voyager partition, and if so;
- (g) Means for determining whether the selected event is (i) a Start Event or (ii) a Stop Event or (iii) an Initiate Auto Recovery Event.

11. The system of claim 10 wherein means (g) recognizes (i) a start event and from there includes:
- (gi) means to write a start record into said local database.

12. The system of claim 10 wherein means (g) recognizes (ii) a stop event and from there includes:
- (gii) means to set a pending stop so as to look for an Initiate Auto Recovery (IAR) event.

13. The system of claim 12 where means (g) recognizes (iii) as an Initiate Auto Recovery Event and further includes:
- (giii) means to end the sequence and not record this information into the local database (110) since the previous pending stop was handled by assigning a causative reason for said stop.

14. The system of claim 12 wherein step (f) means is not a Voyager but indicates the Event is from a ClearPath OS partition, which then further includes:
- (f1) means to determine if said Event was (i) a non-fatal dump or (ii) a fatal dump or (iii) a haltload or a (iv) tracking haltload which then provides a causative reason for said haltload.

15. The system of claim 14 wherein means (f1) recognizes a (i) non-fatal dump and then includes:
- (f1ia) means to find there is a STOP time;
- (f1ib) means for storing the non-fatal dump event record in said local database (110);
- (f1ic) means for storing an unplanned stop Event record in said database (110);
- (f1id) means to find a start time and store the start event in said database (110).

16. The system of claim 13 wherein step (giii) of means to assign a causative reason for the stop in a Voyager system includes:
- (giiia) means to determine if a stop was pending, and if so;
- (giiib) means for determining if the current event is a tracking event;
- (giiic) means for determining a cited causative reason for said stop by looking at the IAR event.

17. The system of claim 16 wherein step (giiic) means includes:
- (giiic1) means to determine if said stop event is planned or unplanned.

18. The system of claim 17 wherein said means (giiic1) includes:
- (giiic1a) means for stor-ing planned/unplanned events in said local database.

19. The system of claim 14 wherein means (f1) recognizes a (ii) fatal dump which further includes:
- (f1iia) means to find and record there is a STOP time to said fatal dump;
- (f1iib) means for storing the fatal dump event record in said local database.

20. The system of claim 14 wherein said means (f1) recognizes a (iii) haltload and further includes:
- (f1iiia) means to find there is a STOP time;
- (f1iiib) means for determining the reason for said haltload;
- (f1iiic) means for storing the haltload event record in said local database;
- (f1iiid) means for determining if there is a start time, and if so;
- (f1iiie) storing a start event record in said local database.

21. The system of claim 14 wherein step (f1) recognizes a (iv) tracking haltload and further includes:
- (f1iiia) means to find there is a STOP time;
- (f1iiib) means for determining reason for said STOP;
- (f1iiic) means for storing the reason for a clean shutdown in said local database.

\* \* \* \* \*